(12) United States Patent
Rich

(10) Patent No.: US 6,267,081 B1
(45) Date of Patent: Jul. 31, 2001

(54) SAFETY RESTRAINT AND RELEASE LEASH

(76) Inventor: James E. Rich, 802 S. Bayfront, Balboa Island, CA (US) 92662

( * ) Notice: Subject to any disclaimer, the term of this patent is extended or adjusted under 35 U.S.C. 154(b) by 0 days.

(21) Appl. No.: 09/287,615

(22) Filed: Apr. 7, 1999

(51) Int. Cl.[7] ............................................. A01K 1/08
(52) U.S. Cl. ........................... 119/772; 119/769; 119/799
(58) Field of Search .................................. 119/772, 769, 119/799, 795

(56) References Cited

U.S. PATENT DOCUMENTS

| | | |
|---|---|---|
| 3,872,834 | 3/1975 | Fuhrman . |
| 3,990,404 | 11/1976 | McNicoll . |
| 4,270,491 | 6/1981 | Cox . |
| 4,530,617 | 7/1985 | Hawie . |
| 4,739,578 | 4/1988 | Pitchford, Jr. . |
| 5,067,445 | 11/1991 | Matthews . |
| 5,335,627 | 8/1994 | Bandimere . |
| 5,469,814 | 11/1995 | Moy et al. . |
| 5,682,840 | 11/1997 | McFarland . |
| 5,713,308 | 2/1998 | Holt, Jr. . |
| 5,743,216 | 4/1998 | Holt, Jr. . |
| 5,752,731 | 5/1998 | Crone . |
| 5,803,017 | 9/1998 | Stewart . |
| 6,006,699 | * 12/1999 | Keever ................................. 119/795 |
| 6,053,129 | * 4/2000 | Akre .................................... 119/795 |
| 6,082,308 | * 7/2000 | Walter ................................. 119/769 |

* cited by examiner

Primary Examiner—Charles T. Jordan
Assistant Examiner—Judith A. Nelson
(74) Attorney, Agent, or Firm—Stout, Uxa, Buyan & Mullins, LLP; Donald E. Stout

(57) ABSTRACT

A slip leash for dogs and other small quadrupeds has a head loop portion and a handle portion, configured generally to resemble a figure-eight. In the preferred embodiment, both the head loop portion and the handle portion are rigid along part of their respective lengths and flexible along the remainder of their respective lengths. Near the end of the rigid portion of the handle loop, a ring is attached or formed from the leash material, which preferably comprises a hollow braided rope. The leash material is passed through the ring so that the head loop can be made smaller (tighter around the head of the animal) or looser to release the animal by pulling on opposing sides of the handle loop.

13 Claims, 2 Drawing Sheets

SAFETY RESTRAINT AND RELEASE LEASH

FIELD OF THE INVENTION

The present invention relates generally to the field of animal restraint devices for small quadruped animals, and more particularly to a partially rigid slip leash that can be used to approach a potentially dangerous animal that may bite, without the need for the handler to place his or her hand in proximity to the animal's head to apply or release the leash.

BACKGROUND OF THE INVENTION

Animal handlers in places such as veterinarian offices, zoos, pet shops, or animal shelters must approach animals many times a day to place a leash over their heads. The temperament of the animal is often not known. Some animals, such as dogs, trust their owners, but fear strangers. They can suddenly bite if a stranger approaches their head, particularly when they are in a strange environment. These dogs are known as fear aggressive dogs or fear biters. To their owners, they may never have shown aggressive behavior. The owner does not always understand if the animal handler approaches the animal in an apparent defensive position, and may be offended if the dog is handled defensively with the use of a restrictive device, such as a snare pole. The animal handler, on the other hand, must handle many potential fear biters per day, and over time there will be attempts to bite. Fear biters are unpredictable. Bite attempts will increase with noise and being in a strange place, as may occur in a veterinary office, with other people and frightened animals present and a lot of noisy activity.

In addition, fear aggressive dogs perceive any approach over their heads as a threat. As an animal handler reaches over or toward the animal's head, the risk of a bite increases. Approaching at eye lever or below is considered less of a threat. A traditional flexible leash 5, as illustrated in prior art FIG. 1, is applied over the head with the loop hanging down from the hand 7. This is when most dog bites occur. Frequently, the animal handler who senses a potential bite will toss the leash toward the head with a lasso motion so as not to get too close to the teeth. This sudden toss of a leash may frighten the animal and trigger a bite attempt.

Of course, public relations is another consideration. Oftentimes, the dog's owner will observe the action of the animal handler and may perceive the restraining method employed by the handler as excessive and unnecessary, and may be resentful. This resentment may result in the loss of a client, in the case of a veterinarian, or in negative publicity, in the case of a zoo or animal control agency.

U.S. Pat. No. 3,990,404, to McNicholl, discloses a double-action, two-way slip noose restraint device which allows the noose to be adjusted to either a restricted or an expanded configuration by pulling on opposite sides of the handle loop. This leash allows the release of the leash from the animal without the need to approach the head with one's hand, but has the disadvantage of not permitting the capture of the animal without approaching the top of the head or tossing the loop toward the animal.

U.S. Pat. No. 4,270,491, to Cox, discloses a "FIG.-8" style animal leash which has a quick-adjusting ring and an adjustable stop button which regulates the size of the choke or noose portion of the leash. The body of the leash is constructed of slick plastic rope. As this leash is flexible, it requires the animal handler to closely approach the head and neck of an animal and this may cause a bite injury.

As noted above, animal control snares and poles are well known in the prior art for the control and release of dangerous animals. The snare pole is typically made of heavy metal which has metal cable at one end to catch the animal around the neck. They function effectively for their intended purpose, but when used in front of witnesses to an animal capture, may appear cruel and inhumane.

What is needed, therefore, is a safe and effective apparatus for restraining and controlling an animal which may be dangerous to the handler, either because of temperament or circumstances, but which is perceived by the animal's owner and the public as being comfortable for the animal.

SUMMARY OF THE INVENTION

The present invention solves many longstanding problems in the prior art by providing a slip leash for animals that can be brought about the head of an animal so as to allow the animal handler to stay at a safe distance from a dog, cat or other animal that may bite at the hands of the handler, and which may be applied slowly around the animal's neck, so as not to suddenly frighten the animal, as can occur with state of the art snap snares which are released quickly and close suddenly to capture the animal around the neck.

More particularly, in one aspect of the invention, a safety restraint and release leash is provided which comprises a head loop for engaging a portion of an animal in order to attach said leash to the animal. The head loop has an adjustable length so that the loop may be selectively varied in size, with a portion of the length of the head loop being rigid and a portion of the length of the head loop being flexible. The rigid portion functions to ensure that the head loop maintains a consistent size so that the head loop may be slowly placed over the head of the animal. The inventive leash further comprises a handle portion for gripping the leash and controlling the animal when the head loop is engaged with a portion of said animal.

In another aspect of the invention, a safety restraint and release leash is provided which comprises a head loop for engaging a portion of an animal in order to attach said leash to the animal, wherein the head loop has an adjustable length so that the loop may be selectively varied in size. The inventive leash further comprises a handle portion for gripping the leash and controlling the animal when the head loop is engaged with a portion of the animal, wherein the handle portion has a length and is rigid along a portion of its length, so that an animal handler can readily maintain a predetermined distance from the animal being engaged.

In still another aspect of the invention, there is provided a safety restraint and release leash which comprises an animal engaging portion having a length, a handle portion having a length, and an adjustment slide disposed between the animal engaging portion and the handle portion to inversely vary the respective lengths of each of the animal engaging and handle portions. Advantageously, a substantial portion of the length of at least one of the handle portion and the animal engaging portion is rigid, in order to permit the animal handler to maintain a safe distance from the animal's mouth at all times. Preferably, both a substantial portion of the length of the handle portion and a substantial portion of the length of the head loop portion are rigid, in order to both permit the animal handler to maintain a safe distance from the animal, and to also permit the handler to maintain a consistently sized head loop, which is not possible with totally flexible leashes, so that it is possible to slowly apply the leash to the animal.

In still another aspect of the invention, a safety restraint and release leash is provided which comprises an animal engaging portion having a length and a handle portion having a length. The animal engaging and handle portions are both adjustable in length relative to one another so that an animal may be engaged and released from the animal engaging portion by adjusting the length of the animal engaging portion to be shorter and longer, respectively. The inventive leash further comprises a pad disposed on the leash which is adapted to contact the head or neck of the animal when the animal is engaged by the animal engaging portion.

The invention, together with additional features and advantages thereof, may best be understood by reference to the following description taken in conjunction with the accompanying illustrative drawing.

DESCRIPTION OF THE INVENTION

Figure 1:
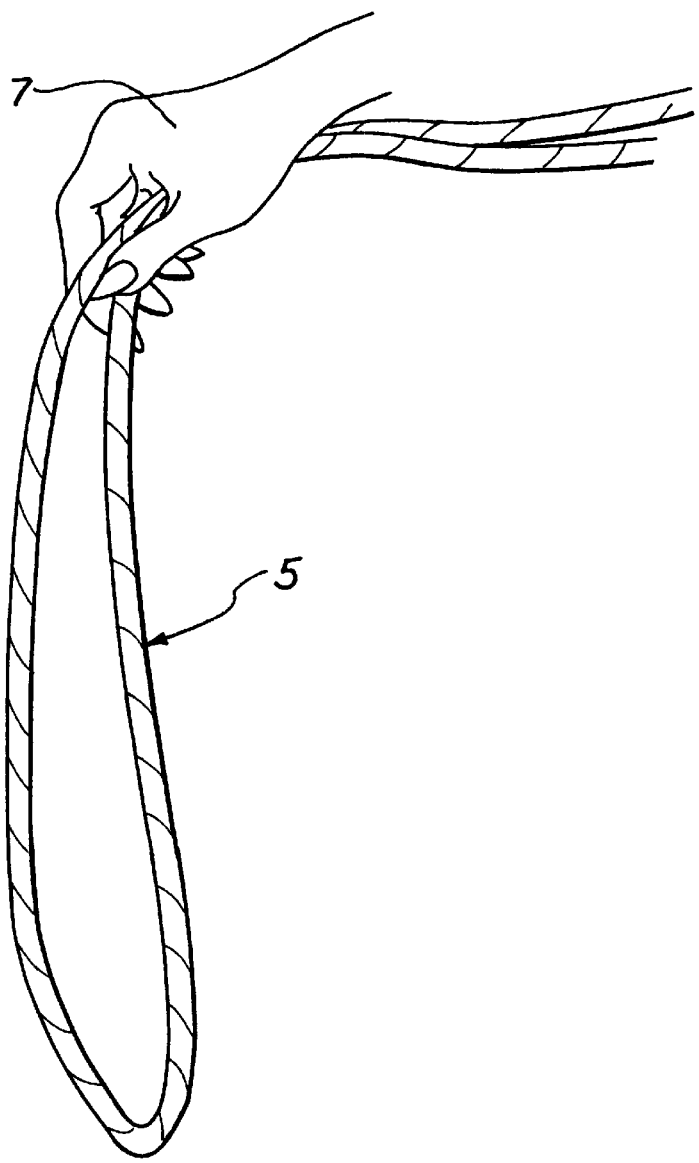
FIG. 1 is a plan view of a prior art flexible leash being held in the hand of an animal handler.
Figure 4:
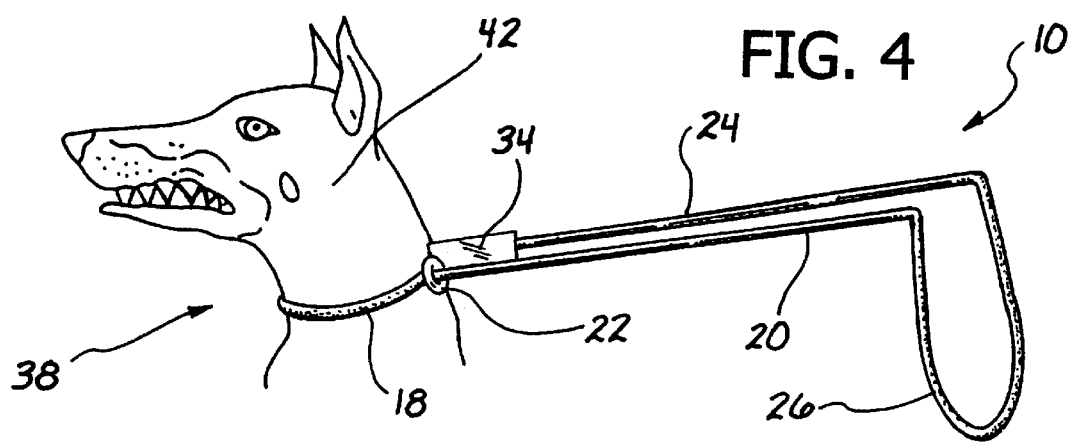
FIG. 4 is a perspective view of the safety restraint and release leash applied to restrain an animal.
Figure 2:
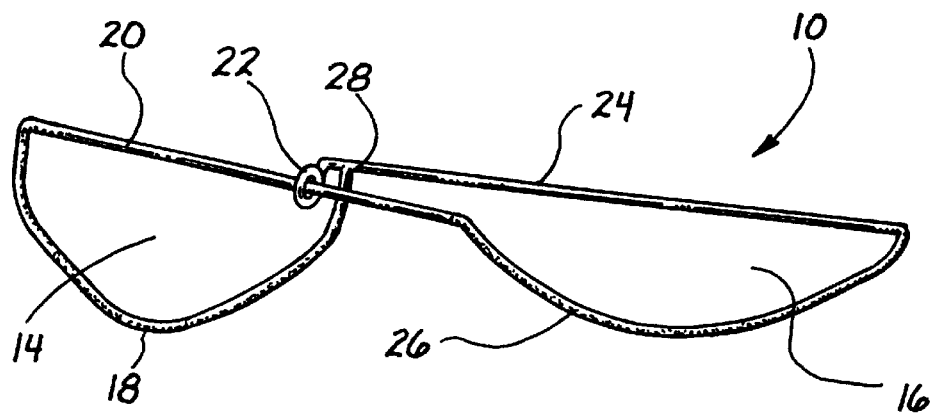
FIG. 2 is a plan view of a safety restraint and release leash constructed in accordance with the principles of the invention.
Figure 3:
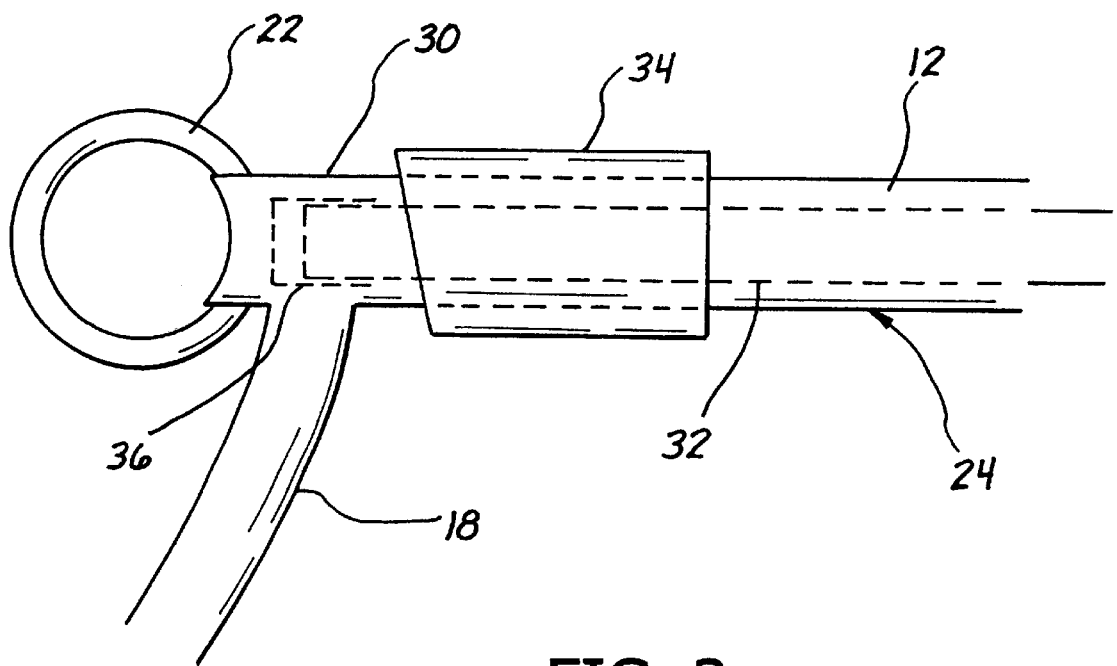
FIG. 3 is a schematic plan view of a portion of the safety restraint and release leash illustrated in FIG. 2.

Referring now more particularly to FIGS. 2–4, a safety restraint and release leash 10 is illustrated which is constructed in accordance with the principles of the invention. The leash 10 is preferably constructed of a braided, flexible rope-like material, such as polypropylene or nylon, having a hollow center or lumen 12 (FIG. 3), and is arranged to form a head loop 14 and a handle loop 16 (FIG. 2). The head loop 14 is defined by a first flexible portion 18 and a first rigid portion 20. The first rigid portion 20 extends through a ring 22. The handle loop 16 is defined by a second rigid portion 24 and a second flexible portion 26. An end 28 of the first flexible portion 18 may be attached to the ring 22, or, preferably, to the second rigid portion 24 near the ring.

The ring 22 may be made of metal or any other rigid, durable material, and can be any desired shape, with an "O" shape being preferred. Alternatively, a ring could be created by making a loop in the flexible rope 18 at the end of the second rigid handle 24. The ring 22 may be disposed near the second rigid portion 24, as illustrated, or connected to the second rigid portion 24, but could also be disposed away from the second rigid portion, if desired, with a length of flexible rope between second rigid portion 24 and the ring 22. The leash material is passed through the ring 22 so that the head loop 14 can be made smaller (tighter around the head of an animal) or looser (to release the animal) by pulling on opposite sides of the handle 16, as will be described more fully hereinbelow.

Referring now particularly to FIG. 3, the constructional details of the second rigid portion 24 are illustrated. As shown, the second rigid portion 24 comprises an external hollow rope 30, preferably formed of a flexible, braided material such as polypropylene or nylon, having a hollow center or lumen 12. Disposed within the lumen 12 is a rigid rod 32, shown in phantom, which is preferably constructed of a rigid material such as metal, fiberglass, nylon, wood, or the like. Of course, the rod 32 provides the portion 24 with its rigidity. A soft pad 34, which may be comprised of foam, rubber, cloth, or similar material, is disposed about the rigid portion 24.

Of course, the first rigid portion 20 is preferably constructed in a manner similar to that of the second rigid portion 24, with a rod disposed in the hollow center or lumen of a flexible rope. The flexible portions 18 and 26 are also preferably constructed in a similar manner as the rigid portions, except for the lack of a rigid rod. It should be noted that a particular advantage of the inventive construction, i.e. the placement of a rigid rod at the center of the hollow rope 30, is the resultant appearance of the leash 10. Because only the flexible rope is visible, the device looks like a regular leash, rather than having the heavy metal appearance of a snare pole.

Preferably, the rigid rods 32 which are disposed within the hollow ropes of rigid portions 20 and 24 are held in place by gluing or sewing them into a desired position, so that they do not slip or move inside the hollow rope. Additionally, a portion of flexible tubing 36 (FIG. 3), made of a material such as polyethylene, polyvinyl chloride (PVC), rubber, or the like, may be applied to each end of the rigid rod 32 in rigid portions 20 and 24. This tubing 36 serves to help prevent the rigid rod 32 from passing through (piercing) the rope portion 30 of rigid portions 20 and 24 so that portions of the rod extend to the outside of the external hollow rope, wherein injury may occur to the animal being restrained or to the animal handler. This optional tubing 36 may also be glued or sewn into the external hollow rope 30.

In operation, when an animal handler desires to apply the leash 10 to an animal 38 (FIG. 4), the head loop 14, in an expanded position, as shown in FIG. 2, is brought toward the animal at near eye level slowly, in order to be placed over the neck. The second rigid portion 24 allows the animal handler to slowly extend the head loop 14 toward the animal's head 42 (and mouth), while maintaining a safe distance from the teeth of the animal. Should the animal snap and bite, the handler is less likely to be bitten, due to the distance. The first rigid portion 20 allows the head loop 14 to maintain its configuration, once adjusted by the handler, unlike the case for an entirely flexible leash, permitting the handler to be able to slowly move the loop 14 to a position about the animal's head. This approach is much less likely to startle the animal than the old "lasso" approach often utilized with flexible leashes. Once the head loop 14 is placed over the animal's neck, the handler pulls on the second flexible portion 26 (FIG. 2) so that the first rigid portion 20 slides through the ring 22, toward the handler, thereby reducing the size of the head loop 14 until the first flexible portion 18 is snug around the neck, as shown in FIG. 4. When the desired loop size is obtained, one or both of the handler's hands can hold the second flexible portion 26, or a combination of any of the portions 26, 20, and 24, if desired. By doing so, the handler may control the animal and by use of the pair of rigid portions 20 and 24 may keep the animal at a safe distance if desired.

As also illustrated in FIG. 4, one advantageous feature of the present invention is the pad 34, which touches the back of the animal's head 42 and neck area when the leash 10 is applied. Those skilled in the art know that by placing a slight pressure on an animal's head and neck a tranquilizing effect is created, which tends to keep the animal calm during capture and release. This pad serves this purpose in an innovative manner.

When the animal 38 is to be released from the leash 10, the second rigid portion 24 and the second flexible portion 26 are held separately, and by pulling rigid portion 24 away from the animal and toward the handler, the head loop 14 is loosened, as the ring 22 passes over the rigid portion 20 toward the handler. During the release, the handler can maintain his or her distance from the animal's head 42, should the animal attempt to bite at this time.

While this invention has been described with respect to various specific examples and embodiments, it is to be understood that the invention is not limited thereto and that it can be variously practiced within the scope of the following claims.

What is claimed is:

1. A safety restraint and release leash, comprising:
   a head loop for engaging a portion of an animal in order to attach said leash to the animal, the head loop having an adjustable length so that the loop may be selectively varied in size, a portion of said length being rigid and a portion of said length being flexible, the rigid portion functioning to ensure that the head loop maintains a consistent size so that the head loop may be slowly placed over the head of the animal; and
   a handle portion for gripping said leash and controlling said animal when the head loop is engaged with a portion of said animal.

2. The safety restraint and release leash as recited in claim 1, wherein said head loop comprises an external flexible hollow tube having a lumen, and said rigid portion of said length comprises a rigid element disposed in said lumen.

3. The safety restraint and release leash as recited in claim 2, wherein said rigid element comprises a rod.

4. The safety restraint and release leash as recited in claim 3, wherein said rod includes a piece of flexible tubing disposed over an end thereof.

5. The safety restraint and release leash as recited in claim 1, wherein said handle portion comprises a handle loop having a length, a portion of said handle length being rigid and a portion of said handle length being flexible.

6. The safety restraint and release leash as recited in claim 1, and further comprising an adjustment ring disposed about a portion of said head loop, so that said head loop portion is slidable within said ring, thereby permitting adjustment of the length of said head loop.

7. The safety restraint and release leash as recited in claim 1, and further comprising a pad disposed on said leash, so that when said leash is engaged with said animal, the pad touches a portion of said animal.

8. A safety restraint and release leash, comprising:
   a head loop for engaging a portion of an animal in order to attach said leash to the animal, the head loop having an adjustable length so that the loop may be selectively varied in size; and
   a handle portion for gripping said leash and controlling said animal when the head loop is engaged with a portion of said animal, said handle portion having a length and being rigid along a portion of its length, so that an animal handler can readily maintain a predetermined distance from the animal being engaged.

9. The safety restraint and release leash as recited in claim 8, wherein said handle portion comprises an external flexible hollow tube having a lumen, and said rigid portion comprises a rigid element disposed along said rigid portion in said lumen.

10. The safety restraint and release leash as recited in claim 9, wherein said rigid element comprises a rod.

11. The safety restraint and release leash as recited in claim 10, wherein said rod includes a piece of flexible tubing disposed over an end thereof.

12. A safety restraint and release leash, comprising:
    an animal engaging portion having a length;
    a handle portion having, a length and a flexible portion comprising a portion of said length;
    an adjustment slide disposed between said animal engaging portion and said handle portion to inversely vary the respective lengths of each of said animal engaging and handle portions;
    a first rigid portion being disposed on a first end of said flexible portion; and
    a second rigid portion being disposed on a second end of said flexible portion.

13. A safety restraint and release leash, comprising:
    an animal engaging portion having a length;
    a handle portion having a length, wherein the animal engaging and handle portions are adjustable in length relative to one another so that an animal may be engaged and released from said animal engaging portion by adjusting the length of the animal engaging portion to be shorter and longer, respectively; and
    a pad disposed on said leash which is adapted to contact the head or neck of the animal when the animal is engaged by the animal engaging portion.

* * * * *